United States Patent
Starr

[15] 3,669,135
[45] June 13, 1972

[54] FLUIDIC DEVICE FOR MODULATING THE TEMPERATURE OF COOLING LIQUID IN A GARMENT

[72] Inventor: James B. Starr, St. Paul, Mich.
[73] Assignee: The United States of America as represented by the Secretary of the Navy
[22] Filed: Nov. 24, 1970
[21] Appl. No.: 92,366

[52] U.S. Cl. ........................................... 137/81.5
[51] Int. Cl. ..........................................F15c 1/14
[58] Field of Search ..................137/81.5; 165/46; 2/2.1

[56] References Cited

UNITED STATES PATENTS

| | | | |
|---|---|---|---|
| 3,468,325 | 9/1969 | Bowles | 137/81.5 |
| 3,578,010 | 5/1971 | Campagnuolo | 137/81.5 |
| 3,244,189 | 4/1966 | Bailey | 137/81.5 |
| 3,279,531 | 10/1966 | Bowles | 137/81.5 X |
| 3,289,748 | 12/1966 | Jennings | 165/46 |

*Primary Examiner*—William R. Cline
*Attorney*—R. S. Sciascia, H. H. Losche and Paul S. Collignon

[57] ABSTRACT

A fluidic device for controlling the temperature of cooling liquid in a garment, such as a space suit. A power port is provided through which cold fluid enters the device and first and second output ports are provided. The first output port is connected to tubes in the garment and the second output port is vented to a return system. A warm water port is connected to the first output port and first and second control ports are provided for controlling the amount of cold fluid entering the first output port. An adjustable valve is provided in the second output port for varying the resistance to flow of liquid through the second output port.

3 Claims, 1 Drawing Figure

PATENTED JUN 13 1972
3,669,135
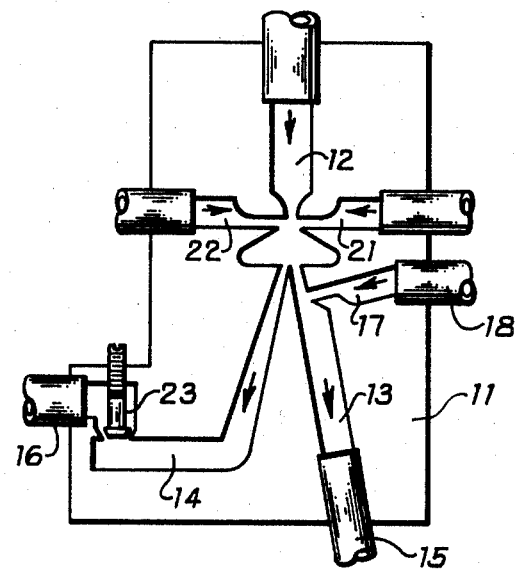
INVENTOR.
JAMES B. STARR
BY H. H. Losche
Paul J. Collignon
ATTORNEYS

FLUIDIC DEVICE FOR MODULATING THE TEMPERATURE OF COOLING LIQUID IN A GARMENT

CROSS-REFERENCE TO RELATED APPLICATION

Patent application of James B. Starr, entitled, "Temperature Control System For Space Suit," Ser. No. 92, 469 filed Nov. 24, 1970.

BACKGROUND OF THE INVENTION

The present invention relates to a device for regulating temperature of liquid and more particularly to a fluidic device for modulating the temperature of cooling liquid in a garment.

Liquid-cooled garments have been developed for use as flight suits or space suits and generally consist of a net fabric interwoven with small diameter plastic tubing for carrying fluid. For example, in U.S. Pat. No. 3,289,748, which issued Dec. 6, 1966, to David C. Jennings, there is shown an undergarment including flexible liquid cooling conduits mounted on a net fabric in such a fashion as to be in contact with the skin of the wearer so as to cool the body by direct conduction of heat. This cooling technique is fundamentally different from the older gas-cooling method in which heat is removed primarily by evaporation of perspiration. Liquid-cooled garments are generally operated at temperatures low enough to suppress perspiration, thereby providing adequate cooling without danger of dehydration. The rate of heat removal by liquid-cooled garments is primarily a function of liquid temperature. Correct body thermal regulation therefore requires adjustment of coolant temperature as metabolic rate and external thermal loads vary. Gas cooling, by contrast, tends to be self-regulating because the body is able to modulate the cooling rate automatically by varying perspiration rate. Use of a liquid-cooled garment, therefore, requires additional attention to coolant temperature adjustment to obtain a satisfactory thermal state.

Available liquid-cooled garments provide overall temperature control and rely on the person wearing the garment to regulate coolant temperature to achieve a satisfactory thermal state. In critical operational situations, however, the person wearing the garment may not have time to concern himself with his own comfort and his performance may be impaired precisely when maximum effectiveness is required. Thermal discomfort may also arise from localized external thermal loads as, for example, those caused by radiation from a warm cockpit canopy. In this case, zoned temperature control would be desirable, but manual operation of such a system would excessively encumber a person wearing the garment.

In the above-referenced patent application, there is described a control system for a liquid-cooled garment wherein the temperature of the liquid flowing in the garment is modulated by mixing warm and cold streams of water in various proportions. A refrigeration system is used to generate a cold fluid supply and body heat is used to generate a source of warm fluid by continually recirculating fluid through the garment without removing heat. The system consists of two principal loops. A warm fluid loop is provided which includes the garment circulating passages, a mixing valve and a pump, and a cold fluid loop is provided which includes a refrigeration system, a throttle valve and a pump. If no fluid flows from the cold loop to the warm loop, then the temperature of the fluid in the warm loop will increase and approach the mean skin temperature of the subject. When cooling is desired, a quantity of cold fluid is fed through a cold fluid throttle into the warm loop. In order to maintain continuity, an equal quantity of fluid flows out of the warm loop through a crossover line into the cold loop. The quantity of cold fluid entering the warm loop is modulated by a throttle valve which operates in response to a skin-temperature sensing element.

SUMMARY OF THE INVENTION

The present invention relates to a fluidic device that performs the functions of the throttle and mixing valve shown in the above-referenced patent application. Cold liquid enters the fluidic device through a power port and is directed through two outlet ports by a pair of opposed control ports. Warm liquid enters through a port which is connected to one of the outlet ports. An adjustable valve is provided in the other outlet port for varying the resistance to flow of liquid through the outlet port.

BRIEF DESCRIPTION OF THE DRAWING

The FIGURE of the drawing is a schematic representation of a preferred embodiment of the present invention.

DESCRIPTION OF THE PREFERRED EMBODIMENT

Referring now to the drawing, there is shown a body portion 11 having an inlet port 12 and outlet ports 13 and 14. Outlet port 13 is connected to tubing 15 which carries fluid to a garment, and outlet port 14 is connected to tubing 16 which carries fluid back to a cooling system. A warm water port 17 is connected to outlet port 13 and warm fluid is carried to port 17 by tubing 18. Control ports 21 and 22 are provided on opposite sides of inlet port 12 for directing cold fluid entering port 12 to outlet ports 13 and 14. An adjustable valve 23 is threadedly attached to body portion 11 and is positioned in an aperture in outlet port 14 for varying the resistance to flow of liquid through output port 14.

In operation, cold fluid enters body portion 11 through inlet port 12. When the control pressure in control port 22 is greater than the control pressure in control port 21, cold fluid is directed down outlet port 13 and mixes with the warm fluid entering by port 17. When the control pressure in control port 21 is greater than the control pressure in control port 22, cold fluid is directed into outlet port 14. Valve 23 can be adjusted to vary the resistance to vent flow out of the fluidic device. When the device is used in the system shown in the above-referenced patent application, the adjustment of valve 23 facilitates balancing the multi-zone system so that, at sufficiently low skin temperatures, no cold fluid enters the cooling passages of the garment.

I claim:

1. A fluidic device for modulating the temperature of liquid for a space suit comprising,
    a body portion having an interaction region,
    an inlet port for admitting cooling liquid into said interaction region,
    first and second output ports communicating with said interaction region,
    first and second control ports communicating with said interaction region for selectively shifting cooling liquid to said first and second output ports,
    a warm water port connected with said first output port, and
    an adjustable valve in said second output port for varying the resistance to flow of liquid through said second output port.

2. A fluidic device for modulating the temperature of liquid for a space suit as set forth in claim 1 wherein said first and second control ports are positioned on opposite sides of said inlet port.

3. A fluidic device for modulating the temperature of liquid for a space suit as set forth in claim 1 wherein said adjustable valve is threadedly attached to said body portion whereby the output opening of said second output port is adjustable.

* * * * *